United States Patent [19]

Murakami et al.

[11] Patent Number: 5,462,592
[45] Date of Patent: Oct. 31, 1995

[54] AQUEOUS INK COMPOSITION

[75] Inventors: Kakuji Murakami, Kawasaki; Kiyofumi Nagai, Tokyo, both of Japan

[73] Assignee: Ricoh Company, Ltd., Tokyo, Japan

[21] Appl. No.: 72,734

[22] Filed: Jun. 7, 1993

[30] Foreign Application Priority Data

Jun. 9, 1992 [JP] Japan ................... 4-149375
Jul. 14, 1992 [JP] Japan ................... 4-186927

[51] Int. Cl.$^6$ ................... C09D 11/02
[52] U.S. Cl. ................... 106/22 R; 106/22 H; 106/22 F; 106/22 E; 106/27 R
[58] Field of Search ................... 106/22 R, 22 H, 106/22 F, 22 E, 27 R

[56] References Cited

U.S. PATENT DOCUMENTS

| | | | |
|---|---|---|---|
| 3,985,663 | 10/1976 | Lu et al. | 106/20 B |
| 4,256,493 | 3/1981 | Yokoyama et al. | 106/27 R |
| 4,352,691 | 10/1982 | Owatari et al. | 106/22 R |
| 5,061,316 | 10/1991 | Moffatt | 106/22 H |
| 5,062,892 | 11/1991 | Halko | 106/22 H |
| 5,116,410 | 5/1992 | Miller | 106/22 R |
| 5,258,064 | 11/1993 | Colt | 106/22 R |

FOREIGN PATENT DOCUMENTS

| | | |
|---|---|---|
| 90070 | 6/1982 | Japan. |
| 48374 | 3/1988 | Japan. |

*Primary Examiner*—Helene Klemanski
*Attorney, Agent, or Firm*—Cooper & Dunham

[57] ABSTRACT

An aqueous ink composition contains a water-soluble dye composed of an anionic dye component and a cationic dye counter-ion; and an anionic additive composed of an anionic additive component and a cationic additive counter ion. The cationic additive counter ion may be one of a lithium cation, a quaternary ammonium cation or a quaternary phosphonium cation, with the amount of the anionic additive being 0.2 wt. % or more of the total weight of the aqueous ink composition.

10 Claims, No Drawings

AQUEOUS INK COMPOSITION

BACKGROUND OF THE INVENTION

1. Field of the Invention

The present invention relates to an aqueous ink composition for use in an ink-jet printer and a pen plotter which are used to record information output by a computer, or transmitted by a facsimile apparatus, or which provide video images and photographic images; writing utensils such as ball point pens, marking pens and fountain pens; and various kinds of recorders employing a pen, a stamp or a pad.

2. Discussion of Background

An ink-jet recording method is capable of recording images by ejecting a liquid ink from a nozzle. This ink-jet printing method has the advantages that images can be recorded on a sheet of plain paper, color images can easily be produced and the printing speed is high, so that many kinds of ink-jet printers which work on various ink-ejection principles are commercially available.

For example, conventional ink-jet printers employ the following ink-ejection principles:

(1) By use of a piezoelectric element such as a PZT which is deformed by the application of a voltage thereto, pressure is applied to an ink contained in a tank to eject the ink from a nozzle.

(2) An electrostatic field controlled by turning an electrode on or off is applied to the ink, thereby ejecting the ink from a nozzle.

(3) Thermal energy is applied to the ink by use of a heating element, to change the phase of the ink resulting in the ink being ejected from a nozzle because of a change in the volume of the ink.

(4) A predetermined pressure is continuously applied to an ink by use of a pump, so that the ink is continuously ejected from a nozzle. During the continuous ejection of the ink, the charging conditions for each ink drop are controlled by an electrode disposed near the nozzle, thereby controlling the direction of ejection of the ink drops.

The ink for use in the above-mentioned ink-jet printer and writing utensils is required to contain a dye at a sufficiently high concentration to produce images with high image density. In addition, the requirements for the ink are as follows:

Produced images have high water-resistance.

The ink has high light-resistance.

The values of the physical properties of the ink, such as viscosity and surface tension, are within the proper ranges.

No precipitates are formed in the ink composition and the desired physical properties do not change during a long period of storage.

Normal recording can be carried out with a pen or ink-jet printer without clogging the pen point or printer nozzle with the ink even if the recording operation is resumed after a long intermission.

However, in general, dyes with good water-resistance lack solubility, so that an ink composition comprising a dye with high water-resistance clogs a nozzle. Furthermore, the higher the concentration of a dye in an ink composition, the more easily the nozzle is clogged. As previously mentioned, it is difficult to satisfy all the requirements for the ink composition at the same time.

To solve the above-mentioned problems, attention has been paid to the selection of a dye and a wetting agent to be contained in an ink composition and the addition of a dye-solubilizer and a surface active agent thereto. For instance, an ink composition comprises a dye which contains a sulfonic acid in the form of a lithium salt, as disclosed in Japanese Laid-Open Patent Application 57-202358; an ink composition comprises as a dye a quarternary-ammonium-ion-containing salt, as disclosed in Japanese Laid-Open Patent Application 62-149770; and an ink composition comprises as a dye a quaternary-phosphonium-ion-containing salt, as disclosed in Japanese Laid-Open Patent Application 63-48374.

Even though the aforementioned dyes have high water-resistance, and are contained in the respective ink compositions at a high concentration, the clogging of a pen point or a nozzle of the ink-jet printer can be avoided because the dyes are contained in the form of a salt in the ink compositions. However, most commercially available water-soluble anionic dyes are available in the form of a sodium salt. In order to exchange a cationic dye counter ion of the anionic dye in the form of a sodium salt with a desired cationic dye counter ion, it is necessary to carry out a complicated operation such as acidifying-out, treatment by use of an ion-exchange resin, or salting-out. The application of this kind of preparation procedure, however, is restricted from the viewpoint of coat.

The previously mentioned conventional ink-jet printing method employs an aqueous ink composition. The reason for this is that an aqueous ink composition is water-based and very safe for the user even if the user touches the ink composition, drinks it by mistake, or inhales the vapor from the ink composition. In addition, when the aqueous ink composition is used for recording images, sharp images can be obtained without being spread on a sheet of paper since the surface tension of water is higher than the surface tensions of other liquids for use in the ink composition.

However, the water-based aqueous ink composition lacks affinity for paper, especially for paper which has been sized, so that the penetrating speed of the ink through the paper is slow after the ink drops are deposited on the surface of the paper. Consequently, the apparent drying rate is slow. Therefore, recorded images are often impaired when touched or after coming into contact with transporting members and papers successively transported into a printer while the ink component stays wet on the paper. In addition, when a color image is produced on the paper by superimposing a plurality of colored inks, the color image is apt to be impaired at the boundaries of a secondary color obtained by superimposing the colored inks.

To solve the above-mentioned problems, it is proposed to use as a recording medium a sheet of paper which contains no sizing agent, or only a reduced amount of sizing agent, as disclosed in Japanese Laid-Open Patent Application 52-74340; and a recording paper comprising a surface layer which mainly comprises a white pigment and a water-soluble polymeric material, as disclosed in Japanese Laid-Open Patent Applications 52-5312 and 56-89594. The above-mentioned specific recording media can solve the above-mentioned problem. However, there is a demand for images recorded on ordinary plain papers for home or office use.

Furthermore, Japanese Laid-Open Patent Application 56-57862 discloses a method for increasing the drying characteristics of an ink. More specifically, the ink is adjusted to a pH of 12 or more by dissolving an alkaline compound therein at high concentration. Thus, a sizing agent for use in paper can be dissolved in the ink, so that the drying characteristics of the ink can be improved. According to this method, the penetrating speed of the ink through a so-called acidic paper, which has been sized by the use of rosin, can be increased to some extent. However, in the case where color images are recorded on the acidic paper by superimposing the colored inks, the impairing of recorded images at the boundaries of a secondary color obtained by superimposing the color inks cannot be prevented. This method is ineffective for a neutral paper which has recently been into common use. Another shortcoming of this method is that the life span of a head portion of an ink-jet printer used for ejecting the ink is shortened because the ink composition with a high pH value has adverse effects on a material used for the head of the ink-jet printer.

In order to improve the drying characteristics of such inks, an ink composition comprising an aliphatic monovalent alcohol is proposed, as disclosed in Japanese Laid-Open Patent Application 55-145774. In this case, the penetrating speed through the paper can be increased to some extent. However, when the aliphatic monovalent alcohol is contained in the ink composition at high concentration, a dye component separates out, clogging a nozzle of an ink-jet printer, and the problem of emitting an unpleasant odor often arises. On the other hand, when the concentration of the aliphatic monovalent alcohol is decreased, the drying speed of the resulting ink composition becomes insufficient to prevent the impairing of the recorded color images at the boundaries of the secondary color.

To increase the penetrating speed of the ink through the paper, the addition of a surface active agent to an ink composition has been proposed, as disclosed in Japanese Laid-Open Patent Application 55-29546. According to this method, the penetrating speed of the ink through the paper can be increased by using a proper surface active agent, so that the impairing of color images at the boundaries of the secondary color can be prevented. However, organic members such as plastics and adhesives for constructing a head portion of an ink-jet printer swell when used in contact with a commercially available surface active agent, or are dissolved in the surface active agent, resulting in the reduction of the life of the head portion. In addition, the clogging of a nozzle with an ink cannot always be solved by this method.

An aqueous ink composition for ink-jet printers, comprising a salt of perfluorosulfonic acid serving as an anionic surface active agent, is proposed in Japanese Laid-Open Patent Application 57-90070. According to this application, the potassium salt of perfluorosulfonic acid is preferable as a surface active agent. However, the objects of the present invention cannot be achieved by the aforementioned ink composition, which comprises the anionic surface active agent in the form of a salt comprising a potassium cation.

SUMMARY OF THE INVENTION

Accordingly, a first object of the present invention is to provide an aqueous ink composition prepared at a low manufacturing cost, free from the above-mentioned conventional shortcomings, and capable of performing normal printing, writing and recording operations without clogging a pen point or a printer nozzle even though these operations are resumed after a long intermission.

A second object of the present invention is to provide an aqueous ink composition for ink-jet printing, capable of maintaining a printer head in a stable manner in an ink-jet printer during repeated operations.

A third object of the present invention is to provide an aqueous ink composition which comprises a dye with high water-resistance and light-resistance at a high concentration, and is capable of producing colored images with high quality on a sheet of plain paper.

The above-mentioned objects of the present invention can be achieved by an aqueous ink composition comprising a water-soluble dye which comprises an anionic dye component and a cationic dye counter ion; and an anionic additive comprising an anionic additive component and a cationic additive counter ion which is selected from the group consisting of a lithium cation, a quaternary ammonium cation and a quaternary phosphonium cation, with the amount of the anionic additive being 0.2 wt.% or more of the total weight of the aqueous ink composition.

DESCRIPTION OF THE PREFERRED EMBODIMENTS

The aqueous ink composition according to the present invention comprises a coloring material such as a dye. The ink composition of the present invention further comprises an anionic additive, which may serve as a wetting agent capable of imparting water retention characteristics to the ink composition and dissolving the dye therein when a water component has been evaporated; a dye-solubilizer for increasing the solubility of the dye; an image-density increasing agent; a water-resistance imparting agent; an abrasion-resistance improving agent; a penetration-improving agent; an agent for preventing image blur; an antiseptic; an ultraviolet absorbing agent; a corrosion preventing agent; a chelating agent; a pH adjustor; a viscosity modifier; a surface tension adjustor; an electroconductivity adjustor; a free radical inhibitor; an antioxidant; and an oxygen absorbing agent.

The anionic additive is conventionally used in the form of a sodium salt, potassium salt, ammonium salt ($NH_4^+$), or amine salt in the ink composition. In contrast to this, the anionic additive for use in the ink composition of the present invention comprises an anionic additive component and a cationic additive counter ion selected from the group consisting of a lithium cation, a quaternary ammonium cation, and a quaternary phosphonium cation. Because of the use of this anionic additive, even when a water-resistant anionic dye is contained in the ink composition at a high concentration, the clogging of the nozzle can effectively be prevented without using the above-mentioned cation such as a lithium cation, a quaternary ammonium cation or a quaternary phosphonium cation as a cationic dye counter ion for the water-resistant anionic dye.

Furthermore, the anionic additive comprising the above-mentioned cationic additive counter ion can be prepared more easily and at a lower cost, as compared with the preparation of the anionic dye comprising the above-mentioned cationic dye counter ion.

The anionic additive is usually commercially available in the form of a free acid. However, in the case where the anionic additive is obtained in the form of a sodium salt, potassium salt or ammonium salt, the cationic counter ion of the anionic additive may be directly exchanged for a desired counter ion in the present invention by use of an ion-exchange resin or by the salting-out method with the addition of a salt containing the desired counter ion to a solution, for example, a sodium solution. To change a salt such as a sodium salt to a free acid, the method using an ion-exchange resin can be employed. Alternatively, a strong acid may be added to the anionic additive, for example, in the form of a sodium salt or a solution thereof, followed by extraction with a solvent, distillation or filtration.

In the case where the anionic additive can be obtained in the form of a free acid, a hydroxide containing the cationic counter ion, that is, a lithium cation, a quaternary ammonium cation, or a quaternary phosphonium cation, may be added to the free-acid type anionic additive or a solution thereof.

When the anionic additive is available in the form of a free acid, it is not necessary to change the anionic additive in the form of a free acid to a salt comprising the desired counter ion, namely, a lithium cation, a quaternary ammonium cation, or a quaternary phosphonium cation, prior to the preparation of the ink composition. In this case, a hydroxide comprising a lithium cation, a quaternary ammonium cation or a quaternary phosphonium cation in an amount equivalent or more to the anionic additive in the form of a free acid is added, and the pH of the obtained ink composition is adjusted to 6.0 or more. The thus obtained ink composition comprises the anionic additive comprising the above-mentioned cationic counter ion, so that the procedure for preparation of the ink composition can be simplified and accordingly the manufacturing cost of the ink composition can be reduced. In addition, the ink composition substantially causing no clogging problem can be obtained without difficulty.

In the present invention, when the anionic additive comprises the quaternary ammonium cation or quaternary phosphonium cation, it is preferable that the quaternary ammonium cation or quaternary phosphonium cation comprise a substituted or unsubstituted alkyl group, with the number of carbon atoms in one molecule of the cation being in the range of 4 to 12. When the number of the carbon atoms is within the above range, the solubility of the anionic additive in water is not decreased, so that clogging can effectively be prevented in the course of the continuous printing operation or during the intermission of the printing operation, and the formation of precipitates in the ink composition can be avoided during the storage of the ink composition. In addition, even when the ink composition is again used for printing or writing after the printer or the writing utensils have been allowed to stand without using, images can be recorded still more steadily.

Specific examples of the quaternary ammonium cation (A-1 to A-15) and quaternary phosphonium cation (P-1 to P-12) for use in the anionic additive are as follows:

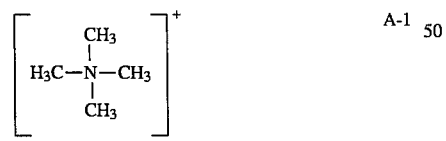  A-1

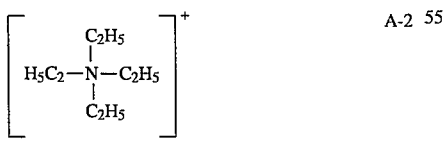  A-2

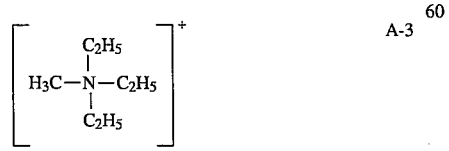  A-3

-continued

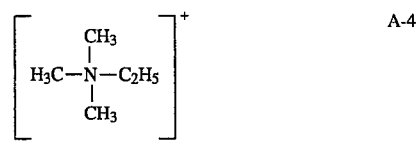  A-4

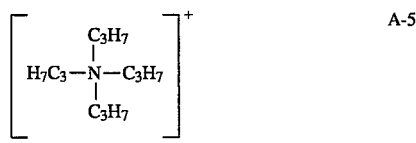  A-5

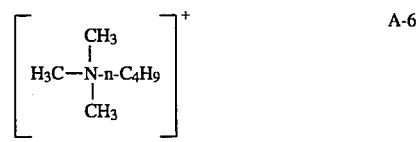  A-6

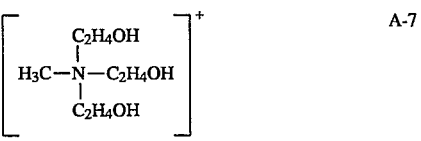  A-7

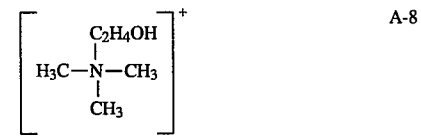  A-8

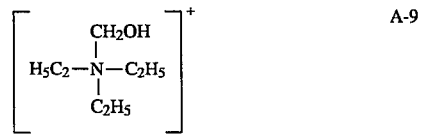  A-9

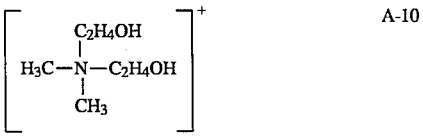  A-10

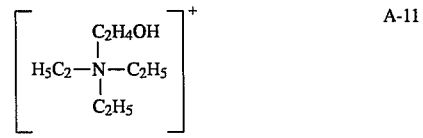  A-11

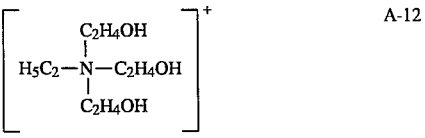  A-12

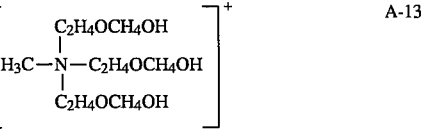  A-13

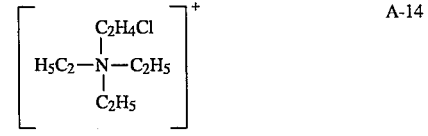  A-14

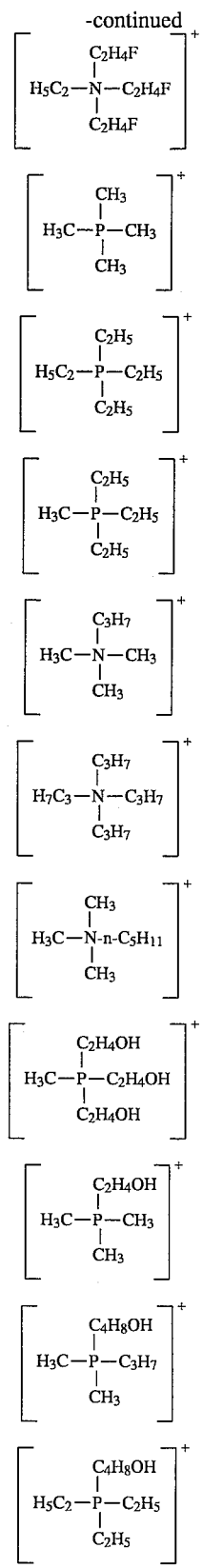

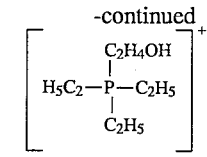

A-15

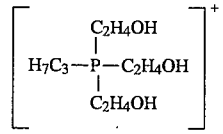

P-11

P-1

P-12

P-2  Preferable examples of the anionic additive for use in the present invention include monomers such as acetic acid, propionic acid, tartaric acid, lactic acid, malonic acid, malic acid, oxalic acid, succinic acid, gluconic acid, mannonic acid, citric acid, benzoic acid, phthalic acid, terephthalic acid, trimellitic acid, p-chlorobenzoic acid, phenylacetic acid, salicylic acid, p-hydroxyphenylacetic acid, mandelic acid, procatechuic acid, paratoluenesulfonic acid, o-cresolsulfonic acid, 2-naphthol-3,6-disulfonic acid, p-phenolsulfonic acid, phenylphosphonic acid, aminotrimethylenephosphonic acid, 2-pyridinethiol-1-oxide, sorbic acid, dehydroacetic acid, ethylenediaminetetraacetic acid, aspartic acid, arginine, glutamic acid, alanine, glycine, inosinic acid, uridylic acid, guanyl, cytidylic acid, sulfurous acid and phosphoric acid, and inorganic salts of the above monomers; and polymers or oligomers such as polyacrylic acid and salts thereof, polymethacrylic acid and salts thereof, alginic acid and salts thereof, carboxymethyl cellulose, acacia gum, a salt of a hydrolyzed compound of styrene-maleic anhydride copolymer, a salt of a hydrolyzed compound of styrene-isobutylene-phthalimide copolymer, starch phosphate salt, starch glycolate salt, polyphosphate, and salts of chondroitin sulfuric acid.

A striking effect for preventing the clogging of a nozzle of a printer with the ink can be achieved when the molar ratio of the cation selected from the group consisting of a lithium cation, a quaternary ammonium cation and a quaternary phosphonium cation is 20% or more of the entire cations contained in the aqueous ink composition. In this case, the formation of precipitates in the ink composition can be prevented during the storage of the ink composition, and therefore, images can be still more steadily produced after the intermission of the printing operation.

The kind of anionic additive and the amount thereof are selected with consideration given not only to the clogging-preventing characteristics, but also to other characteristics required for the ink composition. More specifically, the kind and amount of anionic additive may be determined in accordance with the kind of wetting agent contained in the ink composition and the amount thereof, and the thermal stability of the anionic additive to be used. In the present invention, the amount of the anionic additive is 0.2 wt. % or more of the total weight of the ink composition. Generally, it is preferable that the anionic additive in the form of a salt containing a lithium cation, a quaternary ammonium cation or a quaternary phosphonium cation be highly soluble in the wetting agent and water. Namely, in order to ensure the clogging-preventing characteristics of the ink composition, the wetting agent, and the anionic additive and the cationic counter ion therefor may be selected in such a fashion that 10 wt. % or more of the anionic additive is soluble in the wetting agent.

The ink composition of the present invention comprises a water-soluble dye comprising an anionic dye component and a cationic dye counter ion. The conventional water-soluble anionic dyes can be employed in the present invention.

The water-soluble dyes with the following color index numbers are preferably used in the present invention:

| | |
|---|---|
| C.I. Acid Yellow | 17, 23, 42, 44, 79, 142 |
| C.I. Acid Red | 1, 13, 14, 18, 26, 27, 35, 37, 42, 52, 82, 87, 89, 92, 97, 111, 114, 115, 134, 186, 249, 254, 289 |
| C.I. Acid Blue | 9, 29, 45, 89, 92, 249 |
| C.I. Acid Black | 1, 2, 7, 24, 26, 94 |
| C.I. Food Yellow | 3, 4 |
| C.I. Food Red | 7, 9, 14 |
| C.I. Food Black | 1, 2 |
| C.I. Direct Yellow | 1, 12, 26, 33, 44, 50, 86, 120, 132, 142, 144 |
| C.I. Direct Red | 1, 9, 13, 17, 20, 28, 31, 39, 80, 81, 83, 89, 225, 227 |
| C.I. Direct Orange | 26, 29, 62, 102, |
| C.I. Direct Blue | 1, 2, 15, 22, 25, 71, 76, 79, 86, 87, 98, 163, 165, 202 |
| C.I. Direct Black | 19, 22, 32, 38, 51, 56, 74, 75, 77, 154, 168 |

In addition to the above-mentioned water-soluble dyes, other conventionally known dyes can be employed. It is not necessary that the water-soluble dye for use in the ink composition have a cationic dye counter ion such as a lithium cation, a quaternary ammonium cation or a quaternary phosphonium cation. Water-soluble dyes conventionally available in the form of a sodium salt can be used in the present invention.

To further increase the reliability of the ink composition, it is preferable that the cationic counter ion of the anionic water-soluble dye be selected from the group consisting of a lithium cation, a quaternary ammonium cation and a quaternary phosphonium cation.

When the ink composition of the present invention is used for a ink-jet printer, it is preferable that the ink composition comprise the above-mentioned water-soluble dye comprising an anionic dye component and a cationic dye counter ion, water, and an anionic surface active agent comprising an anionic component and a cationic counter ion which is selected from the group consisting of a lithium cation, a quaternary ammonium cation and a quaternary phosphonium cation, with the mixing ratio by wt. % of the dye to water to the anionic surface active agent being (0.2–10): (30–95): (0.2–10).

In the present invention, it is preferable that the amount of the water-soluble dye be 0.2 to 10 wt. % of the total weight of the ink composition when the ink composition is used for the ink-jet printer. When the amount of the water-soluble dye in the ink composition is within the above range, images can be produced with a sufficiently high density without clogging the nozzle of the ink-jet printer. Further, in the case where color images are produced, the deterioration in the perceived chroma of the obtained color images can be avoided.

When the ink composition of the present invention comprises the aforementioned anionic surface active agent, the ink can speedily penetrate into an image-receiving paper and the apparent drying characteristics of the ink composition can be improved. In particular, when a plurality of inks with different colors are superimposed on the same portion of the image-receiving paper to produce colored images, image blurring caused by mingling the colors can be prevented at the boundaries between the images with different colors. Further, since the wetting characteristics of a printer head can be improved by the addition of the anionic surface active agent to the ink composition, the printer head can always be supplied with a sufficient amount of ink even when the ink is ejected from a nozzle of the printer at a high frequency, thereby achieving stable ink ejection. When a cationic surface active agent is added to the above-mentioned ink composition for the ink-jet printer, the cationic surface active agent and the anionic water-soluble dye with high solubility and high light-resistance interact to produce precipitates. In the case where a nonionic surface active agent is added to the ink composition, members of the printer composed of plastics and adhesives are apt to swell when coming into contact with the nonionic surface active agent. The life of each of the above-mentioned members is thus reduced. Materials for constructing the ink-jet printer are strictly restricted, and therefore the manufacturing cost of the printer is increased. In addition, the clogging-preventing effect as previously mentioned cannot be obtained by the addition of the nonionic surface active agent.

The anionic surface active agent for use in the present invention comprises a cationic counter ion selected from the group consisting of a lithium cation, a quaternary ammonium cation and a quaternary phosphonium cation. In addition to the above-mentioned anionic surface active agent, the aqueous ink composition may further comprise a conventional anionic surface active agent comprising a sodium cation, or an ammonium cation, or in the form of a free acid so long as it does not have adverse effects on the present invention.

To minimize the clogging with the ink composition, it is not essential, but preferable that anionic compounds other than the above-mentioned anionic surface active agent comprise a cationic counter ion, such as a lithium cation, a quaternary ammonium cation or a quaternary phosphonium cation.

Most of the previously mentioned commercially available acid dyes and direct dyes are in the form of a sodium salt. The same method of exchanging the cationic counter ion of the anionic additive for a lithium cation, a quaternary ammonium cation or a quaternary phosphonium cation can be employed to exchange the cationic counter ion of the anionic dye in principle. However, since even the acid dye cannot be distilled, and the ion exchange resin used for exchanging the cationic counter ion is clogged with the dye in practice, the dye in the form of the sodium salt may be employed as it is in the ink composition of the present invention from the viewpoint of cost, and it is confirmed that the clogging can be prevented similarly when the commercially available dye in the form of the sodium salt is employed.

Examples of the anionic surface active agent for use in the present invention are as follows:
(a) salts of sulfonic acid: alkylsulfonate, alkylbenzenesulfonate, alkylnaphthalenesulfonate, monoalkylsulfosuccinate, dialkylsulfosuccinate, α-olefinsulfonate, and N-acyl sulfonate.
(b) salts of sulfuric acid: alkyl sulfate, polyoxyethylene alkylethersulfate, polyoxyethylene alkylarylethersulfate and alkylamide sulfate.
(c) salts of carboxylic acid: salts of higher fatty acid, salts of N-acyl amino acid, polyoxyethylene alkylether carboxylate and acylated peptide.
(d) salts of phosphoric ester: monoalkyl phosphate, dialkyl phosphate, trialkyl phosphate, polyoxyethylene alkylether phosphate, bispolyoxyethylene alkylether phosphate, trispolyoxyethylene alkylether phosphate, polyoxyethylene alkylarylether phosphate, bispolyoxyethylene alkylarylether phosphate, and trispolyoxyethylene alkylarylether phosphate.

(e) silicone-containing surface active agent: carboxylic-acid-modified polydimethylsiloxane and sulfonic-acid-modified polydimethylsiloxane.

(f) fluorine-containing surface active agent: salts of fluoroalkylcarboxylic acid, salts of perfluoroalkylsulfonic acid, salts of perfluoroalkenylarylsulfonic acid, salts of N-perfluorooctanesulfonyl glutamic acid, salts of perfluoroalkyl-N-ethyl sulfonylglycine, salts of perfluoroalkyl sulfoneamide propyl trimethyl, salts of 3-(ω-fluoroalkanoyl-N-ethylamino)-1-propanesulfonic acid, and salts of perfluoroalkylethyl phosphoric ester.

With the chain length of an alkyl group in the compound, the presence of branched chain and the length of a polyoxyethylene group taken into consideration, a proper anionic surface active agent may be selected depending on the volume of one droplet of the ink composition ejected from an ink-jet printer to be used; the number of dots per unit area on an image-receiving paper when colored images are produced by superimposing a plurality of colors; the printing speed; and the scope of guaranteed environmental conditions. In any event, it is preferable that the anionic surface active agent for use in the present invention comprise an alkyl group with a branched chain having 4 to 23 carbon atoms, and a polyoxyethylene group having 3 to 20 units of ethylene oxide in one molecule.

The amount of the anionic surface active agent is determined in accordance with the kind of surface active agent to be employed, the kind of other components such as a dye and a wetting agent contained in the ink composition, and the operating conditions for the ink composition. It is preferable that the amount of the anionic surface active agent be in the range of 0.2 to 10 wt. % of the total weight of the ink composition. When the amount of the anionic surface active agent is within the above range, the blurring of obtained color images can effectively be prevented when a plurality of colors are superimposed. In addition, the surface active agent or the dye is not separated from the ink composition, and an increase in viscosity of the ink composition, which makes it difficult to eject the ink from a nozzle, can be avoided in the course of printing operation or during the storage of the ink composition.

The ink composition of the present invention may further comprise a polyhydric alcohol as a wetting agent. Since the previously mentioned anionic additive and the anionic dye which comprises a lithium cation, a quaternary ammonium cation or a quaternary phosphonium cation as the cationic counter-ion are highly soluble in the polyhydric alcohol, not only appropriate physical properties for discharging the ink from the nozzle can be imparted to the ink composition, but also clogging can be prevented during the intermission of the printing operation.

The amount of the polyhydric alcohol is preferably in the range of 3 to 70 wt. % of the total weight of the ink composition, especially in the case where the ink composition is used in an ink-jet printer. When the amount of the polyhydric alcohol is within the above range, the anionic surface active agent serves to sufficient prevent the clogging problem, and the viscosity of the obtained ink composition is suitable for ejection from the printer nozzle.

Preferable examples of the polyhydric alcohol for use in the present invention are ethylene glycol, diethylene glycol, triethylene glycol, tetraethylene glycol, polyethylene glycol, propylene glycol, dipropylene glycol, glycerin, thiodiglycol, polyglycerin, hexamethylenediol, 1,5-pentanediol, 1,6-hexanediol, 2,5-hexanediol, and 2,4-hexanediol.

It is preferable to use the above-mentioned polyhydric alcohols in the present invention. Further, a conventional wetting agent can be used alone or in combination with the above-mentioned polyhydric alcohol; examples of such conventional wetting agent include ethers of polyhydric alcohol such as ethylene glycol monoethyl ether, ethylene glycol monomethyl ether, ethylene glycol monobutyl ether, diethylene glycol monomethyl ether, triethylene glycol monomethyl ether, tetraethylene glycol monomethyl ether, propylene glycol monomethyl ether, ethylene glycol monophenyl ether, diethylene glycol monoethyl ether, triethylene glycol monoethyl ether, tetraethylene glycol monoethyl ether, and propylene glycol monoethyl ether; heterocyclic compounds such as N-methyl-2-pyrrolidone, 1,3-dimethylimidazolidinone, and ε-caprolactam; and alcohol amines such as monoethanolamine, diethanolamine, and triethanolamine.

When the ink composition of the present invention is used in an ink-jet printer, it is preferable that the ink composition further comprise a water-soluble polymeric compound with a molecular weight of 1000 or more. The amount of the water-soluble polymeric compound is preferably in the range of 0.05 to 7 wt. % of the total weight of the ink composition. By the addition of the water-soluble polymeric compound in the above-mentioned amount, the image blurring and the decrease in image density can be prevented. Further, the occurrence of a black band at a joint of main scanning lines which results from excessive spreading of a dot image depending on the kind of image-receiving paper can also be prevented. In particular, a nonionic or anionic polymeric compound is preferable because the dye and the polymeric compound are not apt to interact to generate a precipitate.

Specific examples of the water-soluble polymeric compound for use in the present invention include salts of polyacrylic acid, salts of polymethacrylic acid, salts of alginic acid, carboxymethyl cellulose, gum arabic, salts of a hydrolyzed product of styrene-maleic anhydride copolymer, salts of a hydrolyzed product of styrene-isobutylene-phthalimide copolymer, hyaluronic acid, gelan gum, a condensate of naphthalenesulfonic acid and formalin, polyvinyl arylsulfonate, water-soluble polyamide, hydroxyethyl cellulose, polyvinyl pyrrolidone, polyvinyl alcohol and polyacrylamide.

Of the above-mentioned polymeric compounds, carboxylic-group-containing polymeric compounds such as salts of polyacrylic acid, salts of polymethacrylic acid, salts of alginic acid, carboxymethyl cellulose, gum arabic, salts of a hydrolyzed product of styrene-maleic anhydride copolymer, and salts of a hydrolyzed product of styrene-isobutylene-phthalimide copolymer are particularly preferred to prevent the excessively spreading of a dot-image on the image-receiving paper and to obtain the images with high image density.

When the anionic water-soluble polymeric compound is contained in the ink composition, it is preferable that the employed anionic polymeric compound be in the form of a salt having as a cationic counter ion a lithium cation, a quaternary ammonium cation or a quaternary phosphonium cation.

The amount of the water-soluble polymeric compound may be determined depending on the kind of compound to be used and the desired properties of the obtained ink composition. When the water-soluble polymeric compound is contained in the ink composition in an amount of 0.05 to 7 wt. % of the total weight of the ink composition, the previously mentioned effects can be obtained, and the ink composition can be prevented from becoming structural viscous, so that normal ejection of the ink composition from the nozzle can be ensured and the clogging of the nozzle with the ink can be prevented.

The aqueous ink composition for ink-jet printing according to the present invention may further comprise the conventional compounds serving as an antiseptic, an oxide-absorbing agent, a corrosion preventing agent, an ultraviolet absorbing agent and a free radical inhibitor.

Other features of this invention will become apparent in the course of the following description of exemplary embodiments, which are given for illustration of the invention and are not intended to be limiting thereof.

EXAMPLE 1

A mixture of the following components was stirred at 50° C.:

|  | wt. % |
|---|---|
| C I. Direct Black 154 | 4.0 |
| Diethylene glycol | 5.0 |
| Glycerin | 3.0 |
| N-methyl-2-pyrrolidone | 2.0 |
| Citric acid (M/C = 64) | 3.0 |
| Ion-exchange water | 86.0 |

A 30 wt. % aqueous solution of a tetramethylammonium hydroxide comprising a tetramethylammonium cation (A-1) in an amount of approximately equivalent to the citric acid in the above formulation was added to the above-mentioned mixture during the stirring of the mixture at 50° C., so that the pH of the mixture was adjusted to 9.5.

The mixture was further stirred for four hours and cooled, and then filtered through a 0.1 μm mesh filter, whereby an aqueous ink composition No. 1 according to the present invention was prepared.

The thus obtained ink composition No. 1 was analyzed by ion-exchange chromatography. As a result, about 73% (molar ratio) of the entire cations contained in the ink composition was found to be a tetramethylammonium cation.

Further, the above prepared ink composition No. 1 of the present invention was filled into an ink-jet printer which was designed to eject the ink composition through a nozzle by the application of thermal energy thereto in accordance with a conventional thermal ink-jet printing method, and printing tests were conducted under the following conditions:

| Driving frequency: | 4 kHz |
|---|---|
| Driving voltage: | 25 V |
| Resistivity of heating elements: | 20 Ω |
| Diameter of each the nozzle: | 53 μm |
| Volume of one ink droplet: | 150 pl/dot |
| Number of the nozzles: | 48 nozzles/color (Total: 192 nozzles) |
| Dot density: | 300 dpi |

Test 1

Printing was conducted on three kinds of commercially available copy papers and three kinds of commercially available bond papers serving as image-receiving sheets, and the characteristics of the obtained initial images were evaluated.

Test 2

After the ink-jet printer was allowed to stand at 40° C. and 20% RH for three months, printing was resumed to check whether or not normal printing was possible.

Test 3

Three samples of the ink composition No. 1 were prepared. These samples were referred to a first sample, a second sample and a third sample. The first, second and third samples were allowed to stand at −20° C., room temperature, and 50° C. for one month, respectively. After the storage for one month, the presence or absence of a precipitate in each sample was visually inspected, and the changes in the properties such as the viscosity and surface tension were measured. Furthermore, the filtering characteristics were measured to examine whether a precipitate was present or not in each sample after the storage for one month.

In the above-mentioned test 1, sharp images with an image density of 1.2 or more were obtained on any of the image-receiving sheets.

In the above-mentioned test 2, normal printing was possible after the intermission of the printing operation, without using any step for recoving the original properties of the ink composition No. 1.

In the above-mentioned test 3, no changes in the physical properties and no deterioration in the filtering characteristics were observed in the ink composition No. 1 of the present invention after the storage.

COMPARATIVE EXAMPLE 1

The procedure for preparation of the ink composition No. 1 of the present invention in Example 1 was repeated except that the citric acid and the tetramethylammonium hydroxide were eliminated from the formulation of the aqueous ink composition No. 1, and the amount of the ion-exchange water was increased by the amount corresponding to the amount of the citric acid and the tetramethylammonium hydroxide, whereby a comparative ink composition No. 1 was prepared. The pH of the thus obtained comparative ink composition No. 1 was 9.4.

The comparative ink composition No. 1 was filled into the same ink-jet printer as employed in Example 1, and the same tests 1 through 3 as in Example 1 were conducted.

In the test 1, sharp images similar to those obtained in Example 1 were obtained.

In the test 2, normal printing was impossible after the intermission of the printing operation because 13 out of 48 nozzles were clogged with the ink composition and the ink composition was not ejected therefrom.

In the test 3, no changes in the physical properties and no deterioration in the filtering characteristics were observed in the ink composition after the storage.

COMPARATIVE EXAMPLE 2

The procedure for preparation of the ink composition No. 1 of the present invention in Example 1 was repeated except that the tetramethylammonium hydroxide employed in Example 1 was replaced by sodium hydroxide, so that a comparative ink composition No. 2 was prepared. The pH of the thus obtained comparative ink composition No. 2 was 9.5.

The thus obtained comparative ink composition No. 2 was filled into the same ink-jet printer as employed in Example 1, and the same tests 1 through 3 as in Example 1 were carried out.

In the test 1, sharp images similar to those obtained in Example 1 were obtained.

In the test 2, normal printing was impossible after the intermission of the printing operation because 26 out of 48 nozzles were clogged with the ink composition and the ink composition was not ejected therefrom.

In the test 3, no changes in the physical properties and no deterioration in the filtering characteristics were observed after the storage of the ink composition.

COMPARATIVE EXAMPLE 3

The procedure for preparation of the ink composition No. 1 of the present invention in Example 1 was repeated except that the tetramethylammonium hydroxide was replaced by aqueous ammonia, so that a comparative ink composition No. 3 was prepared. The pH of the thus obtained comparative ink composition No. 3 was 8.5.

The thus obtained comparative ink composition No. 3 was filled into the same ink-jet printer as employed in Example 1, and the same tests 1 through 3 as in Example 1 were conducted.

In the test 1, sharp images similar to those obtained in Example 1 were obtained.

In the test 2, normal printing was impossible after the intermission of the printing operation because 43 out of 48 nozzles were clogged with the ink composition and the ink composition was not ejected therefrom.

In the test 3, no changes in the physical properties and no deterioration in the filtering characteristics were observed in the ink composition after the storage.

EXAMPLE 2

While a mixture of the following components was stirred at 50° C.:

|  | wt. % |
|---|---|
| C.I Direct Black 168 | 3.5 |
| Polyethylene glycol | 2.0 |
| Ethylene glycol | 3.0 |
| Paratoluenesulfonic acid (M/C = 172) | 1.0 |
| Ion-exchange water | 89.5 |

A 35 wt. % aqueous solution of a tetrapropylammonium hydroxide comprising a tetrapropylammonium cation (A-5) in an amount approximately equivalent to the paratoluenesulfonic acid in the above formulation was added to the above-mentioned mixture during the stirring thereof at 50° C., so that the pH of the mixture was adjusted to 7.5.

The mixture was further stirred for four hours and cooled, and then filtered through a 0.1 μm mesh filter, whereby an aqueous ink composition No. 2 according to the present invention was prepared.

The thus obtained ink composition No. 2 was analyzed by ion-exchange chromatography. As a result, about 22% (molar ratio) of the entire cations contained in the ink composition was a tetrapropylammonium cation.

The thus obtained ink composition No. 2 of the present invention was filled into the same ink-jet printer as employed in Example 1, and the same tests 1 through 3 as in Example 1 were conducted.

In the test 1, sharp images with an image density of 1.1 or more were obtained on any of the image-receiving sheets.

In the test 2, normal printing was possible after the intermission of the printing operation without resort to any recovering means.

In the test 3, no changes in physical properties and no deterioration in the filtering characteristics were observed in the ink composition No. 2 of the present invention after the storage.

EXAMPLE 3

A mixture of the following components was stirred at 50° C.:

|  | wt. % |
|---|---|
| C.I. Direct Black 19 | 5.0 |
| Glycerin | 3.0 |
| Diethylene glycol | 8.0 |
| Malic acid (M/C = 67) | 5.0 |
| Ion-exchange water | 79.0 |

A 35 wt. % aqueous solution of lithium hydroxide approximately equivalent to the malic acid in the above formulation was added to the above-mentioned mixture, so that the pH of the mixture was adjusted to 10.2.

The mixture was further stirred for four hours and cooled, and then filtered through a 0.1 μm mesh filter, whereby an aqueous ink composition No. 3 according to the present invention was prepared.

The thus obtained ink composition No. 3 was analyzed by ion-exchange chromatography. As a result, about 44% (molar ratio) of the entire cations contained in the ink composition was found to be a lithium cation.

Further, the air in the above prepared ink composition No. 3 of the present invention was removed therefrom under reduced pressure, and the ink composition was filled into a conventional on-demand type ink-jet printer driven by a PZT. The same printing tests as those in Example 1 were conducted under the following conditions:

| Driving frequency: | 5.6 kHz |
|---|---|
| Driving voltage: | 25 V |
| Diameter of each nozzle: | 47 μm |
| Volume of one ink droplet: | 110 pl/dot |
| Number of the nozzles: | 48 nozzles/color (Total: 192 nozzles) |
| Dot density: | 360 dpi |

In the test 1, sharp images with an image density of 1.2 or more were obtained on any of the image-receiving sheets.

In the test 2, normal printing was possible after the intermission of the printing operation, without resort to any recovering means.

In the test 3, no changes in physical properties and no deterioration in the filtering characteristics were observed in the ink composition No. 3 of the present invention after the storage.

COMPARATIVE EXAMPLE 4

The procedure for preparation of the ink composition No. 3 of the present invention in Example 3 was repeated except that malic acid and lithium hydroxide were eliminated from the formulation of the ink composition No. 3, and the amount of the ion-exchange water was increased by the amount corresponding to the amount of the malic acid and the lithium hydroxide, so that a comparative ink composition No. 4 was prepared. The pH of the thus obtained comparative ink composition was 10.3. About 100% (molar ratio) of the entire cations contained in the ink composition was a sodium cation.

The thus obtained comparative ink composition No. 4 was filled into the same ink-jet printer as employed in Example 3, and the same tests 1 through 3 as in Example 3 were conducted.

In the test 1, sharp images similar to those in Example 3 were obtained.

In the test 2, normal printing was impossible after the intermission of the printing operation because 26 out of 48 nozzles were clogged with the ink composition and the ink composition was not ejected therefrom.

In the test 3, the filtering characteristics of the ink composition deteriorated.

COMPARATIVE EXAMPLE 5

The procedure for preparation of the ink composition No. 3 of the present invention in Example 3 was repeated except that the malic acid used in the formulation in Example 3 was eliminated from the formulation of the ink composition No. 3 and that the same amount of lithium hydroxide as in Example 3 was used for adjusting the pH value of the ink composition, so that a comparative ink composition No. 5 was prepared. The pH of the thus obtained comparative ink composition was 13.5 or more.

The thus obtained comparative ink composition No. 5 was unsuitable for recording because of the lack of safety to the human body and the deterioration of the members constituting the printer by the contact with the ink.

COMPARATIVE EXAMPLE 6

The procedure for preparation of the ink composition No. 3 of the present invention in Example 3 was repeated except that the lithium hydroxide employed in Example 3 was replaced by potassium hydroxide for adjusting the pH value of the ink composition, so that a comparative ink composition No. 6 was prepared. The pH of the thus obtained comparative ink composition was 10.2.

The thus obtained comparative ink composition No. 6 was filled into the same ink-jet printer as employed in Example 3, and the same tests 1 through 3 as in Example 3 were conducted.

In the test 1, sharp images similar to those obtained in Example 3 were obtained.

In the test 2, normal printing was impossible after the intermission of the printing operation because 39 out of 48 nozzles were clogged with the ink composition and the ink composition was not ejected therefrom.

In the test 3, the filtering characteristics of the ink composition deterioration after the storage.

EXAMPLE 4

The procedure for the preparation of the aqueous ink composition No. 3 of the present invention in Example 3 was repeated except that the formulation for the ink composition No. 3 in Example 3 was changed to the following formulation, whereby an aqueous ink composition No. 4 according to the present invention was prepared:

|  | wt. % |
|---|---|
| Copper phthalocyanine tetracarboxylic acid | 2.5 |
| Glycerine | 2.0 |
| Triethylene glycol | 10.0 |
| Succinic acid (M/C = 59) | 2.0 |
| Ion-exchange water | 85.5 |

The pH of the above mixture was adjusted to 11.5 by the addition of a hydroxide comprising quaternary ammonium cation (A-9).

Thus, an aqueous ink composition No. 4 according to the present invention was prepared.

The molar ratio of the quaternary ammonium cation was 100% of the entire cations contained in the aqueous ink composition.

EXAMPLE 5

The procedure for the preparation of the aqueous ink composition No. 3 of the present invention in Example 3 was repeated except that the formulation for the ink composition in Example 3 was changed to the following formulation, whereby an aqueous ink composition No. 5 according to the present invention was prepared:

|  | wt. % |
|---|---|
| C.I. Direct Blue 86 | 3.0 |
| Triethylene glycol | 3.0 |
| Ethylene glycol | 10.0 |
| Diethylene glycol monomethylether | 3.0 |
| p-hydroxyphenylsulfonic acid (M/C = 174) | 2.0 |
| Ion-exchange water | 79.0 |

The pH of the above mixture was adjusted to 6.8 by the addition of a hydroxide comprising quaternary ammonium cation (A-6). Thus, an aqueous ink composition No. 5 according to the present invention was prepared.

The molar ratio of the quaternary ammonium cation was 68% of the entire cations contained in the aqueous ink composition.

EXAMPLE 6

The procedure for the preparation of the aqueous ink composition No. 3 of the present invention in Example 3 was repeated except that the formulation for the ink composition in Example 3 was changed to the following formulation, whereby an aqueous ink composition No. 6 according to the present invention was prepared:

|  | wt. % |
|---|---|
| C.I. Direct Red 227 | 2.5 |
| Hexylene glycol | 7.0 |
| Diethylene glycol | 8.0 |
| Glutamic acid (M/C = 72) | 2.0 |
| Ion-exchange water | 81.5 |

The pH of the above mixture was adjusted to 8.9 by the addition of a hydroxide comprising quaternary ammonium cation (A-11). Thus, an aqueous ink composition No. 6 according to the present invention was prepared.

The molar ratio of the quaternary ammonium cation was 61% of the entire cations contained in the aqueous ink composition.

EXAMPLE 7

The procedure for the preparation of the aqueous ink composition No. 3 of the present invention in Example 3 was repeated except that the formulation for the ink composition in Example 3 was changed to the following formulation, whereby an aqueous ink composition No. 7 according to the present invention was prepared:

|  | wt. % |
|---|---|
| C.I Direct Red 9 | 2.5 |
| Diethylene glycol | 15.0 |
| N-methyl-2-pyrrolidone | 9.0 |
| Phenylphosphonic acid (M/C = 79) | 1.5 |
| Ion-exchange water | 72.0 |

The pH of the above mixture was adjusted to 8.0 by the addition of of lithium hydroxide. Thus, an aqueous ink composition No. 7 according to the present invention was prepared.

The molar ratio of the lithium cation was 68% of the entire cations contained in the aqueous ink composition.

EXAMPLE 8

The procedure for the preparation of the aqueous ink composition No. 3 of the present invention in Example 3 was repeated except that the formulation for the ink composition in Example 3 was changed to the following formulation, whereby an aqueous ink composition No. 8 according to the present invention was prepared:

|  | wt. % |
|---|---|
| C.I. Direct Yellow 44 | 2.5 |
| Thiodiglycol | 10.0 |
| 1,3-dimethylimidazolidinon | 3.0 |
| Acetic acid (M/C = 60) | 1.0 |
| Ion-exchange water | 83.5 |

The pH of the above mixture was adjusted to 9.5 by the addition of a hydroxide comprising quaternary phosphonium cation (P-2). Thus, an aqueous ink composition No. 8 according to the present invention was prepared.

The molar ratio of the quaternary phosphonium cation was 46% of the entire cations contained in the aqueous ink composition.

EXAMPLE 9

The procedure for the preparation of the aqueous ink composition No. 3 of the present invention in Example 3 was repeated except that the formulation for the ink composition in Example 3 was changed to the following formulation, whereby an aqueous ink composition No. 9 according to the present invention was prepared:

|  | wt.% |
|---|---|
| C.I Direct Yellow 86 | 2.5 |
| Glycerin | 10.0 |
| N-methyl-2-pyrrolidone | 8.0 |
| Ethylenediaminetetraacetic acid (M/C = 73) | 1.5 |
| Ion-exchange water | 88.0 |

The pH of the above mixture was adjusted to 10.5 by the addition of a hydroxide comprising quaternary ammonium cation (A-12). Thus, an aqueous ink composition No. 9 according to the present invention was prepared.

The molar ratio of the quaternary ammonium cation was 53% of the entire cations contained in the aqueous ink composition.

EXAMPLE 10

The procedure for the preparation of the aqueous ink composition No. 3 of the present invention in Example 3 was repeated except that the formulation for the ink composition in Example 3 was changed to the following formulation, whereby an aqueous ink composition No. 10 according to the present invention was prepared:

|  | wt. % |
|---|---|
| C.I Direct Yellow 132 | 3.0 |
| Diethylene glycol | 6.0 |
| Glycerin | 2.0 |
| Citric acid (M/C = 64) | 0.5 |
| Phenylphosphonic acid (M/C = 79) | 1.0 |
| Ion-exchange water | 88.0 |

The pH of the above mixture was adjusted to 8.0 by the addition of a hydroxide comprising quaternary ammonium cation (A-1). Thus, an aqueous ink composition No. 10 according to the present invention was prepared.

The molar ratio of the quaternary ammonium cation was 58% of the entire cations contained in the aqueous ink composition.

EXAMPLE 11

The procedure for the preparation of the aqueous ink composition No. 3 of the present invention in Example 3 was repeated except that the formulation for the ink composition in Example 3 was changed to the following formulation, whereby an aqueous ink composition No. 11 according to the present invention was prepared:

|  | wt. % |
|---|---|
| C.I Food Black 2 | 5.0 |
| Diethylene glycol | 6.0 |
| Glycerin | 2.0 |
| Acetic acid (M/C = 60) | 2.0 |
| Aspartic acid (M/C = 67) | 2.0 |
| Polyacrylic acid (M/C = 72) | 0.05 |
| Ion-exchange water | 82.95 |

The pH of the above mixture was adjusted to 10.0 by the addition of a hydroxide comprising quaternary ammonium cation (A-5). Thus, an aqueous ink composition No. 11 according to the present invention was prepared.

The molar ratio of the quaternary ammonium cation was 72% of the entire cations contained in the aqueous ink composition.

EXAMPLE 12

The procedure for the preparation of the aqueous ink composition No. 3 of the present invention in Example 3 was repeated except that the formulation for the ink composition in Example 3 was changed to the following formulation, whereby an aqueous ink composition No. 12 according to the present invention was prepared:

|  | wt. % |
| --- | --- |
| C.I Acid Red 289 | 2.5 |
| 1,5-pentanediol | 6.0 |
| Glycerin | 1.0 |
| Diethylene glycol monobutylether | 3.0 |
| Gluconic acid (M/C = 196) | 2.0 |
| Terephthalic acid (M/C = 83) | 1.0 |
| Alginic acid (M/C = 188) | 0.1 |
| Ion-exchange water | 84.4 |

The pH of the above mixture was adjusted to 8.0 by the addition of a hydroxide comprising quaternary ammonium cation (A-5). Thus, an aqueous ink composition No. 12 according to the present invention was prepared.

The molar ratio of the quaternary ammonium cation was 61% of the entire cations contained in the aqueous ink composition.

EXAMPLE 13

The procedure for the preparation of the aqueous ink composition No. 3 of the present invention in Example 3 was repeated except that the formulation for the ink composition in Example 3 was changed to the following formulation, whereby an aqueous ink composition No. 13 according to the present invention was prepared:

|  | wt. % |
| --- | --- |
| C.I. Acid Red 52 | 2.0 |
| Propylene glycol | 6.0 |
| 2,5-hexanodiol | 6.0 |
| Lactic acid (M/C = 90) | 2.5 |
| Sorbic acid (M/C = 112) | 0.5 |
| Ion-exchange water | 88.0 |

The pH of the above mixture was adjusted to 9.5 by the addition of lithium hydroxide. Thus, an aqueous ink composition No. 13 according to the present invention was prepared.

The molar ratio of the lithium cation was 70% of the entire cations contained in the aqueous ink composition.

The same printing tests as in Example 3 were conducted using each of the above prepared ink compositions No. 4 to No. 13 according to the present invention.

In the test 1, with respect to all the ink compositions Nos. 4 to 13, sharp images were obtained with high image density on any of the image-receiving sheets.

In the test 2, with respect to all the ink compositions Nos. 4 to 13, normal printing was possible after the intermission of the printing operation without resort to any recovering means.

In the test 3, with respect to all the ink compositions Nos. 4 to 13, no changes in the physical properties and no deterioration in the filtering characteristics were observed in the ink composition after the storage.

EXAMPLE 14

Preparation of Black Ink Composition

A mixture of the following components was stirred at 50° C.:

|  | wt. % |
| --- | --- |
| C.I. Direct Black 154 | 2.0 |
| Diethylene glycol | 5.0 |
| Glycerin | 3.0 |
| N-methyl-2-pyrrolidone | 3.0 |
| Dodecylbenzone sulfonic acid | 1.0 |
| Alginic acid | 0.1 |
| Ion-exchange water | 83.9 |

A 30 wt. % aqueous solution of tetramethylammonium hydroxide comprising a tetramethylammonium cation (A-1) was added to the above-mentioned mixture so as to adjust the pH of the mixture to 8.0.

The mixture was further stirred for four hours and cooled, and then filtered through a 1 μm mesh filter, whereby an aqueous black ink composition according to the present invention was prepared.

Preparation of Yellow, Magenta and Cyan Ink Compositions

The preparation of the aqueous black ink composition was repeated except that the C.I. Direct Black 154 employed in the formulation for the black ink composition was replaced by each of the following dyes, and the amount of dodecylbenzene sulfonic acid was changed appropriately depending on each dye as shown in the following Table 1, with the adjustment of the amount of the ion-exchange water in each formulation so that the total of all the components constituted 100 wt. %. Thus, aqueous yellow, magenta and cyan ink compositions according to the present invention were separately prepared.

TABLE 1

|  | Dye (Amount) | Amount of dodecyl-benzene sulfonic acid |
| --- | --- | --- |
| Yellow ink composition | C.I. Acid Yellow 23: (1.0 wt. %) | 1.0 wt. % |
| Magenta ink composition | C.I. Acid Red 35: (1.5 wt. %) | 1.0 wt. % |
| Cyan ink composition | C.I. Acid Blue 249: (2.0 wt. %) | 0.6 wt. % |

The air in each of the aqueous ink compositions was removed therefrom by allowing each aqueous ink composition to stand under reduced pressure. Then, the aqueous ink compositions were filled into an on-demand type color ink-jet printer driven by a PZT, and printing tests 3 to 6 were conducted under the following conditions:

| | |
|---|---|
| Driving frequency: | 8 KHz |
| Driving voltage: | 25 V |
| Diameter of each nozzle: | 43 μm |
| Volume of one ink droplet: | 93 pl/dot |
| Number of the nozzles: | 64 nozzles/color (total: 256 nozzles) |
| Dot density: | 300 dpi |

Test 3

The same test 3 as in Example 1 was carried out.

Test 4

Color printing was performed on three kinds of commercially available copy papers and three kinds of commercially available bond papers in such a manner that at least the first and the second colors were superimposed at a dot density of 300 dpi to form a colored image. The image density of a solid colored image obtained by superimposing two colors was measured. In addition, the blurring on the boundaries of the solid colored image was inspected and a dot diameter in the solid colored image was measured. The degree of sizing of the above-mentioned six kinds of recording papers was in the range of 3.3 to 37 sec.

Test 5

Image formation was performed by ejecting each ink composition through a nozzle at regular intervals until the total number of dots formed by the ejection of the ink composition from one nozzle amounted to $10^8$. During this operation, a check was made to see whether or not the ink was ejected from the nozzle in a stable condition.

Test 6

After the ink-jet printer was allowed to stand at 40° C. and 20% RH for one month, the printing operation was resumed, and a check was made to see whether normal printing was possible or not.

The results of the above-mentioned tests are shown in Table 2.

Comparative Example 7

The procedure for preparation of each of the black, yellow, magenta and cyan aqueous ink composition according to the present invention in Example 14 was repeated except that the dodecylbenzenesulfonic acid in the form of a free acid employed in the formulation for each ink composition in Example 14 was replaced by a sodium salt comprising dodecylbenzene sulfonic acid, and that the tetramethylammonium hydroxide comprising tetramethylammonium was replaced by sodium hydroxide, so that comparative black, yellow, magenta and cyan aqueous ink compositions were prepared. The pH of each of the thus obtained aqueous ink compositions was 8.0.

The air in each of the above prepared comparative ink compositions was removed therefrom by allowing each ink composition to stand under reduced pressure. Then, the comparative aqueous ink compositions were filled into the same color ink-jet as employed in Example 14, and the same tests 3 to 6 as in Example 14 were conducted.

The results of the tests are shown in Table 2. The results shown in Table 2, indicate that normal printing was impossible when the printing operation was resumed because the nozzles were clogged with the ink compositions in the test 6.

COMPARATIVE EXAMPLE 8

The procedure for preparation of each of the black, yellow, magenta and cyan aqueous ink compositions according to the present invention in Example 14 was repeated except that the dodecylbenzenesulfonic acid in the form of a free acid employed in the formulation for each ink composition in Example 14 was not employed and the amount of the ion-exchange water was increased by the amount corresponding to the amount of the dodecylbenzenesulfonic acid, so that comparative black, yellow, magenta and cyan aqueous ink compositions were prepared.

The air in each of the above prepared comparative ink compositions was removed therefrom by allowing each ink composition to stand under reduced pressure. Then, the comparative aqueous ink compositions were filled into the same color ink-jet printer as employed in Example 14, and the same tests 3 to 6 as in Example 14 were conducted.

The results of the tests are shown in Table 2. In this case, the ejection of the ink composition was unstable at a driving frequency of 8 kHz, so that the initial printing operation was carried out at a driving frequency of 2 kHz.

In the solid colored image obtained in the test 4, conspicuous blurring was observed at the boundaries of the solid colored image.

In addition, the test 5 was conducted at a driving frequency of 2 kHz, and no ink composition was ejected from any nozzle in the course of the continuous printing operation. The ejection of the ink from the nozzles was recovered by sucking the ink composition. In view of the above-mentioned fact, the air entering a tank for the ink composition is considered to hinder the ejection of the ink composition from the nozzles.

Further, in the test 6, normal printing was impossible when the printing operation was resumed because the nozzles were clogged with the ink compositions.

COMPARATIVE EXAMPLE 9

The procedure for preparation of each of the black, yellow, magenta and cyan aqueous ink compositions according to the present invention in Example 14 was repeated except that the dodecylbenzenesulfonic acid employed in the formulation for each ink composition in Example 14 was replaced by an adduct of n-decyl alcohol with triethylene oxide serving as a nonionic surface active agent, so that comparative black, yellow, magenta and cyan aqueous ink compositions were prepared.

The air in each of the above prepared comparative ink compositions was removed therefrom by allowing each ink composition to stand under reduced pressure. Then, the comparative aqueous ink compositions were filled into the same color ink-jet printer as employed in Example 14, and the same tests 3 to 6 as in Example 14 were conducted.

The results of the tests are shown in Table 2.

In the test 4, initial images similar to those in Example 14 were obtained.

In the test 5, no ink composition was ejected from any nozzle in the course of the continuous printing operation. The ink ejection was not recovered by sucking the ink composition. In view of the above-mentioned fact, it was considered that an adhesive used for joining the members in a tank for the ink composition was impaired.

Further, in the test 6, normal printing was impossible when the printing operation was resumed because the nozzles were clogged with the ink compositions.

EXAMPLE 15

The procedure for preparation of the aqueous black ink composition in Example 14 was repeated except that the formulation for the black ink composition in Example 14 was changed to each formulation as shown below, whereby aqueous black, yellow, magenta and cyan ink compositions according to the present invention were prepared:

|  | wt. % |
|---|---|
| C.I. Direct Black 168 | 4.0 |
| Polyethylene glycol | 3.5 |
| Ethylene glycol | 6.5 |
| Diethylene glycol | 10.0 |
| Lithium malt of di-(2-ethylhexyl) succinic acid | 1.8 |
| Salt of hydrolyzed product of styrene - maleic anhydride copolymer | 0.3 |
| Sodium dehydroacetate (Antiseptic agent) | 0.3 |
| Ion-exchange water | 73.6 |

| [Formulation for Yellow Ink Composition] | |
|---|---|
|  | wt. % |
| C.I. Direct Yellow 132 | 1.5 |
| Tetraethylene glycol | 3.5 |
| Ethylene glycol | 6.5 |
| Diethylene glycol | 10.0 |
| Tetrapropylammonium di-(2-ethylhexyl)sulfosuccinate | 1.2 |
| Salt of hydrolyzed product of styrene - maleic anhydride copolymer | 0.3 |
| Sodium dehydroacetate (Antiseptic agent) | 0.3 |
| Ion-exchange water | 76.7 |

| [Formulation for Magenta Ink Composition] | |
|---|---|
|  | wt. % |
| C.I. Direct Red 227 | 2.0 |
| Glycerin | 3.5 |
| Diethylene glycol | 10.0 |
| Thiodiglycol | 6.5 |
| Tetraethyl phosphonium salt of lauroyl sarcosine (quaternary phosphonium cation P-2) | 1.3 |
| Tetramethylammonium alginate | 0.1 |
| sodium dehydroacetate (Antiseptic agent) | 0.3 |
| Ion-exchange water | 76.3 |

| [Formulation for Cyan Ink Composition] | |
|---|---|
|  | wt. % |
| C.I. Direct Blue 199 | 2.5 |
| Diethylene glycol | 10.0 |
| Ethylene glycol | 5.5 |
| 1,3-dimethylimidazolidinone | 3.5 |
| Salt of N-lauroylmethyltaurine (quaternary ammonium cation A-12) | 1.0 |
| Salt of hydrolyzed product of styrene - maleic anhydride copolymer | 0.2 |
| Sodium dehydroacetate (Antiseptic agent) | 0.3 |
| Ion-exchange water | 77.0 |

| | |
|---|---|
| Driving frequency: | 6 kHz |
| Driving voltage: | 30 V |
| Diameter of nozzle in printer: | 35 μm |
| volume of one ink droplet: | 71 pl/dot |
| Number of nozzles: | 64 nozzles/color (total: 256 nozzles) |
| Dot density: | 300 dpi |

The results of the above-mentioned tests are shown in Table 2.

EXAMPLE 16

The procedure for preparation of the aqueous black ink composition in Example 14 was repeated except that the formulation for the black ink composition in Example 14 was changed to each formulation as shown below, whereby aqueous black, yellow, magenta and cyan ink compositions according to the present invention were prepared:

| Formulation for Black Ink Composition] | |
|---|---|
|  | wt. % |
| C.I. Direct Black 19 | 3.5 |
| Glycerin | 15.0 |
| Diethylene glycol | 20.0 |
| Hexylene glycol | 5.0 |
| Lauryl sulfate (quaternary ammonium cation A-11) | 1.1 |
| Salt of polyacrylic acid | 0.05 |
| Ion-exchange water | 55.35 |

| [Formulation for Yellow Ink Composition] | |
|---|---|
|  | wt. % |
| C.I. Direct Yellow 86 | 2.0 |
| Polyethylene glycol | 10.0 |
| Ethylene glycol | 20.0 |
| N-methyl-2-pyrrolidone | 8.0 |
| Lithium bis-(octaethyleneoxide alkyl ether)phosphorate | 1.2 |
| Lithium alginate | 0.2 |
| Ion-exchange water | 58.6 |

[Formulation for Magenta Ink Composition]

|  | wt. % |
|---|---|
| C.I. Direct Red 254 | 2.5 |
| Triethylene glycol | 12.0 |
| Diethylene glycol | 10.0 |
| Thiodiglycol | 15.0 |
| Salt of tris-(octaethyleneoxide alkyl ether)phosphoric acid (quaternary ammonium cation A-6) | 2.0 |
| Tetramethylammonium alginate | 0.1 |
| Sodium dehydroacetate (antiseptic agent) | 0.3 |
| Ion-exchange water | 58.1 |

[Formulation for Cyan Ink Composition]

|  | wt. % |
|---|---|
| C.I. Acid Blue 9 | 3.0 |
| Ethylene glycol | 42.0 |
| Salt of dodecylbenzenesulfonic acid (quaternary ammonium cation A-8) | 0.4 |
| Salt of hydrolyzed product of styrene - maleic anhydride copolymer | 0.2 |
| Ion-exchange water | 54.4 |

Using each of the above prepared ink compositions according to the present invention, the same tests 3 through 6 as in Example 15 were conducted.

The results of the above-mentioned tests are shown in Table 2.

EXAMPLE 17

The procedure for preparation of the aqueous black ink composition in Example 14 was repeated except that the formulation for the black ink composition in Example 14 was changed to each formulation as shown below, whereby aqueous black, yellow, magenta and cyan ink compositions according to the present invention were prepared:

[Formulation for Black Ink Composition]

|  | wt. % |
|---|---|
| C.I. Food Black 2 | 3.5 |
| Diethylene glycol | 5.0 |
| Tetramethylphosphonium salt of tetraoxyethylenenonylphenyl ether sulfuric acid (quaternary ammonium cation A-5) | 0.6 |
| Carboxymethyl cellulose | 0.07 |
| Ion-exchange water | 90.83 |

[Formulation for Yellow Ink Composition]

|  | wt. % |
|---|---|
| C.I. Acid Yellow 17 | 1.8 |
| Triethylene glycol | 4.0 |
| Tetramethylammonium salt of tetraoxyethylenelaurylether sulfuric acid (quaternary ammonium cation A-5) | 2.0 |
| Polyvinyl alcohol | 3.5 |
| Ion-exchange water | 88.7 |

[Formulation for Magenta Ink Composition]

|  | wt. % |
|---|---|
| C.I. Acid Red 289 | 2.0 |
| Glycerin | 4.0 |
| Tetrapropylammonium salt of di-(2-ethylhexyl)sulfosuccinic acid (quaternary ammonium cation A-5) | 1.5 |
| Polyethylene glycol (molar weight: 2000) | 2.5 |
| Ion-exchange water | 90.0 |

[Formulation for Cyan Ink Composition]

|  | wt. % |
|---|---|
| C.I. Acid Blue 199 | 2.5 |
| Diethylene glycol lauryl sulphuric acid | 5.0 |
| Tetrapropylammonium salt (quaternary ammonium cation A-5) | 0.6 |
| Lithium alginate | 0.2 |
| Ion-exchange water | 91.7 |

Using each of the above prepared ink compositions according to the present invention, the same tests 3 through 6 as in Example 14 were conducted.

The results of the above-mentioned tests are shown in Table 2.

TABLE 2

|  |  |  | Test 4 |  |  |  |  |
|---|---|---|---|---|---|---|---|
|  |  | Test 3 | Blurring of boundaries | Dot diameter (μm) | I.D. (Note 8) | Test 5 | Test 6 |
| Ex. 1 | Y | o (Note 1) | Nil | 112–134 | o | Stable ink ejection | o (Note 6) |
|  | M | o |  | 110–130 | o | Stable ink ejection | o |
|  | C | o |  | 115–135 | o | Stable ink ejection | o |
|  | Bk | o |  | 112–133 | o | Stable ink ejection | o |
| Comp. Ex. 1 | Y | o | Nil | 110–131 | o | Stable ink ejection | x (6/64) (Note 7) |

TABLE 2-continued

|  |  | Test 3 | Test 4 |  |  | Test 5 | Test 6 |
|---|---|---|---|---|---|---|---|
|  |  |  | Blurring of boundaries | Dot diameter (μm) | I.D. (Note 8) |  |  |
|  | M | o |  | 113–130 | o | Stable ink ejection | x (25/64) |
|  | C | o |  | 114–137 | o | Stable ink ejection | x (43/64) |
|  | Bk | o |  | 112–131 | o | Stable ink ejection | x (38/64) |
| Comp. Ex. 2 | Y | o | Conspicuous | 98–115 | o | (Note 3) | x (4/64) |
|  | M | o |  | 97–117 | o | (Note 3) | x (6/64) |
|  | C | o |  | 102–123 | o | (Note 3) | x (29/64) |
|  | Bk | o |  | 96–116 | o | (Note 4) | x (18/64) |
| Comp. Ex. 3 | Y | x (Note 2) | Nil | 109–134 | o | (Note 5) | x (8/64) |
|  | M | o |  | 108–126 | o | (Note 5) | x (7/64) |
|  | C | o |  | 118–139 | o | (Note 5) | x (15/64) |
|  | Bk | x |  | 113–138 | o | (Note 5) | x (19/64) |
| Ex. 2 | Y | o | Nil | 116–124 | o | Stable ink ejection | o |
|  | M | o |  | 116–130 | o | Stable ink ejection | o |
|  | C | o |  | 119–132 | o | Stable ink ejection | o |
|  | Bk | o |  | 114–128 | o | Stable ink ejection | o |
| Ex. 3 | Y | o | Nil | 120–134 | o | Stable ink ejection | o |
|  | M | o |  | 119–133 | o | Stable ink ejection | o |
|  | C | o |  | 123–135 | o | Stable ink ejection | o |
|  | Bk | o |  | 118–126 | o | Stable ink ejection | o |
| Ex. 4 | Y | o | Nil | 112–135 | o | Stable ink ejection | o |
|  | M | o |  | 109–133 | o | Stable ink ejection | o |
|  | C | o |  | 115–139 | o | Stable ink ejection | o |
|  | Bk | o |  | 109–137 | o | Stable ink ejection | o |

Note 1: Neither separation nor precipitation was observed in the ink composition.
Note 2: No precipitates were observed, but a release material was observed only in the ink composition which was stored at 50° C.
Note 3: The printing operation was possible at a driving frequency of less than 2 KHz. The ejection of the ink from all the nozzles became impossible at a driving frequency of 2 KHz in the course of the test.
Note 4: The printing operation was possible at a driving frequency of less than 1 KHz. The ejection of the ink from all the nozzles become impossible at a driving frequency of 1 KHz in the course of the tent.
Note 5: The ejection of the ink from all the nozzles became impossible in the course of the test.
Note 6: Normal printing was possible.
Note 7: For instance, x (6/64) denotes that normal printing were impossible because 6 out of 64 nozzles were clogged with the ink.
Note 8: Mark "o", denotes that high image density was assessed in accordance with the following criteria:
Yellow 0.6 or more on all six kinds of paper.
Magenta 0.9 or more on all six kinds of paper.
Cyan 1.1 or more on all six kinds of paper.
Black 1.0 or more on all six kinds of paper.

As previously explained, the following effects can be obtained by the aqueous ink composition according to the present invention:

(1) The aqueous ink composition of the present invention comprises an anionic additive comprising an anionic additive component and a cationic additive counter-ion selected from the group consisting of a lithium cation, a quaternary ammonium cation and a quaternary phosphonium cation. Therefore, images can be produced steadily without a printer nozzle or a pen point being clogged with the ink when the printing or writing operation is resumed after intermission. In addition, as compared with an anionic dye comprising an anionic dye component and a cationic dye counter ion selected from the above-mentioned cations, the anionic additive for use in the present invention can be obtained easily, so that an aqueous ink composition which does not cause clogging can be obtained at a low cost. Further, a direct dye with high water-resistance is conventionally regarded to be unsuitable for recording because a clogging problem is caused, so that it cannot be used in the formulation for the ink composition of the present invention. Therefore, images which are highly resistant to water can be obtained. In addition, images with high image density can be obtained because the dye can be contained in the ink composition at high concentration.

(2) It is not necessary to prepare the anionic additive comprising a cationic additive counter ion selected from the group consisting of a lithium cation, a quaternary ammonium cation and a quaternary ammonium cation prior to the preparation of the ink composition. More specifically, the anionic additive for use in the present invention may be incorporated in the aqueous ink composition by adding a free acid corresponding to the anionic additive, which can easily be obtained, and mixing the free acid with a hydroxide comprising the above-mentioned cation in the course of the preparation of the ink composition. Therefore, the required steps to prepare the ink composition can be made simple, thereby decreasing the manufacturing cost of the ink composition.

(3) When the quaternary ammonium cation or quaternary phosphonium cation for use in the anionic additive has a substituted or unsubstituted alkyl group, with 4 to 12 carbon atoms in one molecule of the above-mentioned cation, clogging can be effectively prevented. The formation of a precipitate can be avoided during the storage of the ink composition. In addition, when printing or writing operation is resumed after intermission, images can be obtained still more steadily.

(4) When the molar ratio of the cations selected from the group consisting of a lithium cation, a quaternary ammonium cation and a quaternary phosphonium cation is 20% or more of the entire cations contained in the aqueous ink composition, the clogging problem can effectively be prevented. The formation of a precipitate can be avoided during the storage of the ink composition. In addition, when a printing or writing operation is resumed after intermission, images can be obtained still more steadily.

(5) When the aforementioned anionic additive serves as an anionic surface active agent for use in the ink composition for the ink-jet printer, sharp images can be obtained without causing blurring on the boundaries of a color image in the case where a plurality of colors is superimposed, and the ink ejecting operation can be driven at a high frequency. In addition, an organic member constituting a printer head is not impaired, and the generation of a precipitate in the ink composition can be avoided.

(6) When the aqueous ink composition of the present invention further comprises a polyhydric alcohol, the anionic surface active agent and the dye can easily be dissolved in the polyhydric alcohol. As a result, the clogging of a printer nozzle with the ink composition can effectively be prevented during the intermission of printing operation.

(7) When the aqueous ink composition of the present invention further comprises a water-soluble polymeric compound with a molecular weight of 1000 or more, the problems of image blurring, a decrease in image density and the dispersion of a dot diameter depending on the kind of image-receiving sheet can be solved.

What is claimed is:

1. An aqueous ink composition comprising:

a water-soluble dye comprising an anionic dye component and a cationic dye counter ion;

water; and an anionic surface active agent comprising an anionic component and a cationic counter ion which is selected from the group consisting of a lithium cation, a quaternary ammonium cation and a quaternary phosphonium cation, with the amount of said anionic surface active agent being in the range of 0.2 to 10 wt. % of the total weight of said aqueous ink composition.

2. The aqueous ink composition as claimed in claim 1, wherein the mixing ratio by wt. % of said water-soluble dye to said water to said anionic surface active agent being (0.2–10):(30–95):(0.2–10)

3. The aqueous ink composition as claimed in claim 1, wherein said cationic counter ion is a lithium cation.

4. The aqueous ink composition as claimed in claim 1, wherein said cationic counter ion is a quaternary ammonium cation.

5. The aqueous ink composition as claimed in claim 1, further comprising a polyhydric alcohol.

6. The aqueous ink composition as claimed in claim 5, wherein the amount of said polyhydric alcohol is in the range of 3 to 70 wt. % of the total weight of said aqueous ink composition.

7. The aqueous ink composition as claimed in claim 1, further comprising a water-soluble polymeric compound with a molecular weight of 1000 or more.

8. The aqueous ink composition as claimed in claim 7, wherein the amount of said water-soluble polymeric compound is in the range of 0.05 to 7 wt. % of the total of said aqueous ink composition.

9. The aqueous ink composition as claimed in claim 1 wherein said cationic counter ion is a quaternary phosphonium cation.

10. The aqueous ink composition as claimed in claim 1, wherein the amount of said water-soluble dye is in the range of 0.2 to 10 wt.% of the total weight of said aqueous ink composition.

* * * * *